A. KECK.
LINE TIGHTENER.
APPLICATION FILED NOV. 16, 1907.
898,899.
Patented Sept. 15, 1908.
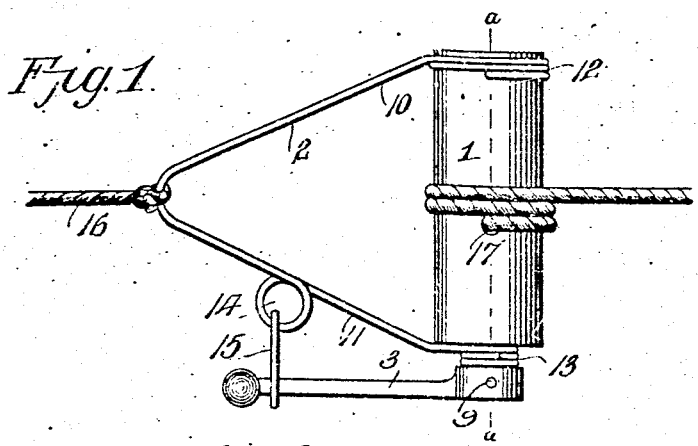
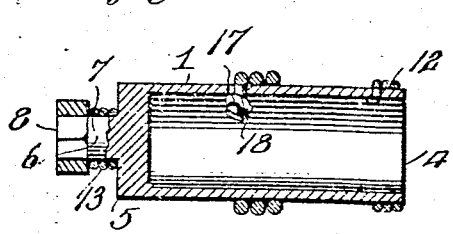
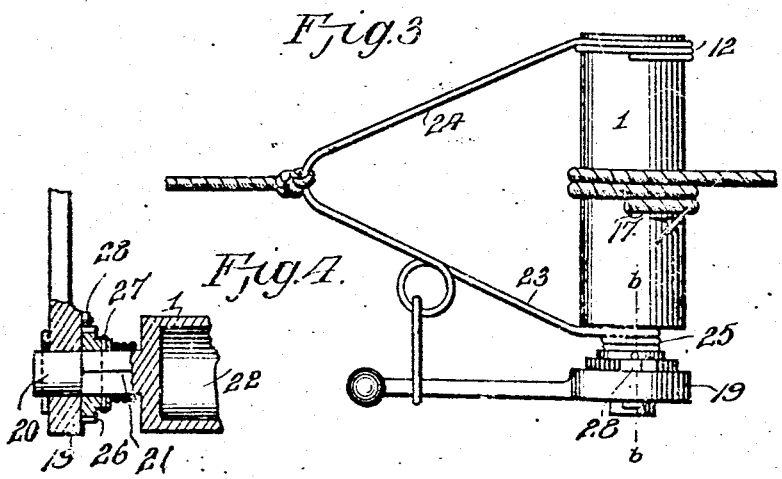
Inventor
Addison Keck,
Witnesses
Frank Hough
J. W. Garner
By Victor J. Evans
Attorney

UNITED STATES PATENT OFFICE

ADDISON KECK, OF SCHENECTADY, NEW YORK.

LINE-TIGHTENER.

No. 898,899.　　　Specification of Letters Patent.　　　Patented Sept. 15, 1908.

Application filed November 16, 1907. Serial No. 402,507.

*To all whom it may concern:*

Be it known that I, ADDISON KECK, a citizen of the United States, residing at Schenectady, in the county of Schenectady and State of New York, have invented new and useful Improvements in Line-Tighteners, of which the following is a specification.

This invention relates to an improvement in line tighteners for taking up the slack in clothes and other lines, and consists in the construction, combination and arrangement of devices hereinafter described and claimed.

The object of my invention is to provide a cheap, simple, strong and durable device of this character which may be readily attached to a clothes or other line and readily operated to tighten or take up slack in the line.

In the accompanying drawings, Figure 1 is a plan view of a line tightener constructed in accordance with my invention. Fig. 2 is a sectional view of the same, taken on the plane indicated by the line *a—a* of Fig. 1. Fig. 3 is a top plan view illustrating a modified form of my improved line tightener, and Fig. 4 is a detail sectional view of the same taken on the plane indicated by the line *b—b* of Fig. 3.

My improved line tightener consists essentially of a drum 1, a bail 2 and a handle 3.
The drum, which is cylindrical in form, is hollow, open at one end, as at 4, closed at the opposite end, as at 5, and is provided at the said closed end with a concentrically disposed portion 6 of reduced diameter, the inner portion 7 of which is cylindrical in form, which constitutes a journal and the outer portion 8 is polygonal in form to enable it to be fitted in a similarly shaped opening in the inner end of the handle 3. Such handle is attached to said polygonal portion by means of the pin 9 or any other suitable device.

The bail 2 is V-shaped to provide arms 10—11, the said bail is made of wire of suitable gage and at the ends of its said arms 10—11 are coils 12—13 respectively of a size to enable them to be respectively fitted on the open end of the drum and on the cylindrical portion 7 of the reduced stud at the closed end of the drum. It will be understood that such coils provide bearings for the drum and cause the drum to be mounted in the outer ends of the arms of the bail for rotation. The arm 11 has an eye 14 formed therein. A link 15 is attached to the said eye and may be engaged with and disengaged from the arm 3. When engaged with said arm, the link prevents the drum from rotation, as will be readily understood.

One end of the line is attached to the bail, as at 16, the other end of the line is partly coiled on the drum, is passed through an opening 17 therein and is provided with a knot 18 on the inner side of the drum which securely attaches said end of the line thereto. It will be understood that by turning the drum to cause the line to wind up on the drum, the line may be shortened to the required extent to take up the slack therein. When the slack of the line has been thus taken up, the link 15 is engaged with the arm 3 to secure the drum against reverse rotation.

In the modified form of my invention shown in Figs. 3 and 4, the handle 19 is mounted on a cylindrical outer portion 20 of the stud 21 which projects from the closed end of the drum 22. The arm 23 of the bail 24 has the coils 25 which form bearings for the said stud. A ratchet wheel 26 is secured to the said stud between the coils 25 and the arm 19 by means of the pin 27 or other suitable device. Such arm 19 is provided with a spring-pressed dog or pawl 28 to engage such ratchet wheel. It will be understood that this construction enables the drum to be rotated to wind up the line by imparting oscillating motion to the arm 19. The operator grasps the drum to prevent it from reversely turning and unreeling the line at each reverse stroke of the arm 19. When the line has been wound up, the arm 19 is fastened to the bail by the link 15.

Having thus described my invention, what I claim as new and desire to secure by Letters-Patent is:—

The herein described line tightener comprising a drum having a journal at one end, said journal having a cylindrical portion and an angular portion; a V-shaped bail having arms each provided with coils, said coils being of such size as to respectively engage the journal and one end, directly, of the drum, one arm of said bail being further provided with an eye, a handle having an opening receiving said journal and a link attached to the said eye and adapted to be engaged and disengaged from the handle.

In testimony whereof, I affix my signature in presence of two witnesses.

ADDISON KECK.

Witnesses:
 MINARD JOHNSON,
 THOMAS R. TILLOTT, Jr.